United States Patent

VanMaele et al.

Patent Number: 5,571,765
Date of Patent: Nov. 5, 1996

[54] THERMAL DYE TRANSFER IMAGE WITH IMPROVED LIGHT-FASTNESS

[75] Inventors: Luc VanMaele, Lochristi; Wilhelmus Janssens, Aarschot, both of Belgium

[73] Assignee: Agfa-Gevaert N.V., Mortsel, Belgium

[21] Appl. No.: 363,279

[22] Filed: Dec. 22, 1994

[30] Foreign Application Priority Data

Jan. 31, 1994 [EP] European Pat. Off. ............ 94200257

[51] Int. Cl.$^6$ ............... B41M 5/035; B41M 5/38
[52] U.S. Cl. ............ 503/227; 428/195; 428/913; 428/914; 430/200
[58] Field of Search ............... 8/471; 430/200; 503/227; 428/195, 913, 914

[56] References Cited

U.S. PATENT DOCUMENTS 5,011,812  4/1991  Bradbury ............... 503/227
5,145,828  9/1992  Etzbach et al. ............ 503/227

FOREIGN PATENT DOCUMENTS 0453020  4/1991  European Pat. Off. ............ 503/227
0578870  7/1992  European Pat. Off. ............ 503/227

*Primary Examiner*—Bruce H. Hess
*Attorney, Agent, or Firm*—Brumbaugh, Graves, Donohue & Raymond

[57] ABSTRACT

The present invention provides a dye donor element comprising on a support a dye layer containing a dye dispersed or dissolved in a binder and a thermotransferable infrared absorbing azo dye having an absorption maximum above 700 nm as a stabilizer, said thermotransferable infrared absorbing azo dye being comprised in said dye layer and/or in a layer adjacent thereto. There is further provided an image receiving element comprising an infrared absorbing azo dye as a stabilizer.

9 Claims, No Drawings

THERMAL DYE TRANSFER IMAGE WITH IMPROVED LIGHT-FASTNESS

DESCRIPTION

1. Field of the Invention

The present invention relates to light-stabilizers for use in thermal dye sublimation transfer and to a method of forming an improved light-fast dye image by thermal dye sublimation transfer.

2. Background of the Invention

Thermal dye transfer methods include thermal dye sublimation transfer also called thermal dye diffusion transfer. This is a recording method in which a dye-donor element provided with a dye layer containing diffusing or sublimating dyes having heat transferability is brought into contact with a receiver sheet and selectively, in accordance with a pattern information signal, heated with a thermal printing head provided with a plurality of juxtaposed heat-generating resistors, whereby dye is transferred from the selectively heated regions of the dye-donor element to the receiver sheet and forms a pattern thereon, the shape and density of which are in accordance with the pattern and intensity of heat applied to the dye-donor element.

A dye-donor element for use according to thermal dye sublimation transfer usually comprises a very thin support e.g. a polyester support, one side of which is covered with a dye layer comprising the printing dyes. Usually, an adhesive or subbing layer is provided between the support and the dye layer. Normally, the opposite side of the support is covered with a slipping layer that provides a lubricated surface against which the thermal printing head can pass without suffering abrasion. An adhesive layer may be provided between the support and the slipping layer.

The dye layer can be a monochromic dye layer or it may comprise sequential repeating areas of differently coloured dyes e.g. dyes having a cyan, magenta, yellow, and optionally black hue. When a dye-donor element containing three or more primary colour dyes is used, a multicolour image can be obtained by sequentially performing the dye transfer process steps for each colour.

A primary coloured dye layer e.g. a magenta or cyan or yellow dye layer may comprise only one primary coloured dye (a magenta, cyan, or yellow dye respectively) or may comprise a mixture of two or more primary coloured dyes of the same hue (two magenta, two cyan, or two yellow dyes respectively).

Dyes are generally unstable to light at least to some extent. Dyes are known to degrade through a number of pathways, which often involve dye triplet states, radicals and/or singlet oxygen. Any improvement in the light stability of dyes is highly desirable therefore.

In photographic silver halide systems various light-stabilizers for dyes are known. For instance UV-absorbers are used frequently in a top layer to shield dyes from the harmful influence of ultraviolet radiation.

Unfortunately, such technique cannot be used in thermal transfer systems, because the dyes, after having been thermally transferred to a receiver sheet, are located in the very top layer of said receiver sheet. If in that case UV-absorbers would be present as well in said top layer, they would intimately mix with the transferred dyes and thus give rise to a so-called catalytic fading effect, which would degrade the dyes even faster.

For use in thermal transfer other types of light-stabilizers such as singlet oxygen quenchers and metal chelates have been described e.g. in EP 312,812. Although these compounds are known to constitute a class of effective stabilizers to light, their performance is not equally adequate for all types of dyes. But above all, the use of such light-stabilizers is undesirable because most of them comprise heavy metal ions, which nowadays raises increasing resistance for ecological reasons.

Furthermore, certain known light-stabilizers cause an undesirable stain in the receiver sheet.

SUMMARY OF THE INVENTION

It is therefore an object of the present invention to provide ecologically acceptable light-stabilizers for improving the light-fastness of dye images obtained according to a thermal dye transfer process also called thermal dye sublimation transfer.

Further objects of the present invention will become clear from the description hereinafter.

These and other objects are achieved according to the present invention by using infrared absorbing azo dyes with an absorption maximum above 700 nm, preferably above 730 nm as light stabilising agents for color dyes. Said light stabilising agent(s) may be included in the image receiving element and/or in the dye donor element used in a thermal transfer process.

In a preferred embodiment of the present invention infrared absorbing azo dyes are used according to the general formula (I):

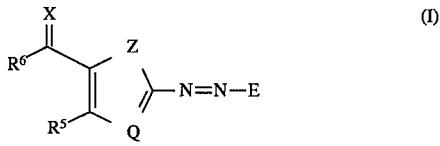

wherein:

E represents the residue of an aromatic coupling component E—Y, wherein Y is a group displaceable by a diazotised aromatic or heterocyclic amine;

Z represents O, S or $NR^{11}$ with $R^{11}$ representing hydrogen, an alkyl, alkenyl, aryl or aralkyl group;

Q represents N or $CR^{12}$ with $R^{12}$ representing hydrogen, an alkyl, an alkenyl, an aryl, an aralkyl, an alkoxy, an alkylthio, hydroxy, cyano, nitro, halogen, oxycarbonyl, a sulphonate, a phosphonate, an amine or carbamoyl group;

X represents $CR^1R^2$, wherein $R^1$ and $R^2$ independently represent a heterocyclic ring or an electron withdrawing group e.g. CN, a carboxylic ester, an amide e.g. carboxylamide, a sulphonate, a phosphonate, a carbonyl group, a nitro group or $R^1$ and $R^2$ together with the atoms to which they are attached represent the necessary atoms for completing a ring system;

$R^5$ represents hydrogen, halogen, CN, an alkyl or aryl group, an amino group, or W—R; W represents O, S, or $SO_2$ and R represents hydrogen, an alkyl, an aryl, a cycloalkyl or CN and $R^6$ represents hydrogen, an alkyl, an aryl, an aryloxy group, an alkoxy group, an alkylthio group, an amino group or an electron withdrawing group, e.g. CN, a halogen, a carboxylic ester, an amide e.g. carboxylamide, a sulphonate, a phosphonate, a carbonyl group, a nitro group.

Thus according to the present invention there is provided a dye donor element comprising on a support a dye layer containing a dye dispersed or dissolved in a binder and a thermotransferable infrared absorbing azo dye having an absorption maximum above 700 nm said thermotransferable infrared absorbing azo dye being comprised in said dye layer and/or a layer adjacent thereto e.g. in a layer on top or below thereof.

The present invention further provides an image receiving element comprising on a support an image receiving layer containing a dye-able resin and an infrared absorbing azo dye having a maximum absorption above 700 nm.

The present invention further provides a method for making an image comprising the steps of:
(i) bringing a dye donor element comprising on a support a dye layer containing a dye dispersed or dissolved in a binder and an infrared absorbing azo dye having an absorption maximum above 700 nm said infrared absorbing azo dye being comprised in said dye layer and/or in a layer adjacent thereto in contact with an image receiving element comprising on a support an image receiving layer containing a dye-able resin such that said image receiving layer is in face-to-face relationship with said dye layer of said dye donor element;
(ii) image-wise heating said dye donor element, thereby causing image-wise transfer of said infrared absorbing azo dye, and
(iii) separating said dye donor element from said image receiving element.

The present invention further provides a method for making an image comprising the steps of:
(i) bringing a dye donor element comprising on a support a dye layer containing a dye dispersed or dissolved in a binder in contact with an image receiving element comprising on a support an image receiving layer containing a dye-able resin and an infrared absorbing azo dye having a maximum absorption above 700 nm such that said image receiving layer is in face-to-face relationship with said dye layer of said dye donor element;
(ii) image-wise heating said dye donor element and
(iii) separating said dye donor element from said image receiving element.

The present invention further provides an assemblage comprising a dye donor element and an image receiving element, said dye donor element comprising on a support a dye layer containing a dye dispersed or dissolved in a binder and a thermotransferable infrared absorbing azo dye having an absorption maximum above 700 nm said thermotransferable infrared absorbing azo dye being comprised in said dye layer and/or in a layer adjacent thereto, and with the proviso that in case said thermotransferable infrared absorbing azo dye is a thiazolylazo dye it has an absorption maximum above 730 nm.

The present invention further provides an assemblage comprising a dye donor element and an image receiving element, said image receiving element comprising on a support an image receiving layer containing a dye-able resin and an infrared absorbing azo dye having a maximum absorption above 700 nm distributed uniformly throughout said image receiving layer.

DETAILED DESCRIPTION OF THE INVENTION

The absorption maxima of the infrared absorbing azo dyes in connection with the present invention is the absorption maximum of the dye in the transferred state i.e. when the dye has been transferred to the image receiving material. Preferably the infrared absorbing azo dyes show no or only little absorption in the visual range of the spectrum i.e. below 700 nm. The infrared absorbing azo dyes in connection with the present invention may be incorporated in the dye donor element or they may be added to the image receiving material. In case they are present in the dye donor element the infrared absorbing azo dyes should be thermotransferable.

Preferred infrared absorbing azo dyes, which are also thermotransferable, correspond to the following formula (II):

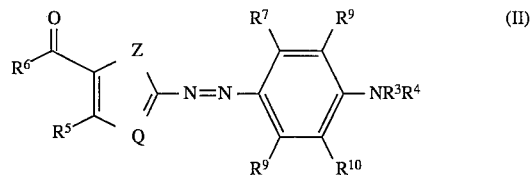

wherein:
Z, X, Q, $R^5$ and $R^6$ have the same meaning as defined in formula (I);

$R^3$ and $R^4$ each independently represent hydrogen, an alkyl group, an alkenyl group, an aryl group, or $R^3$ and $R^4$ together with each other or together with $R^8$ or $R^{10}$ represent the atoms necessary to complete a ring system and $R^7$, $R^8$, $R^9$ and $R^{10}$ each independently represent a hydrogen or a substituent such as e.g. an alkyl, an aryl, a halogen, an alkoxy, a nitro, an oxycarbonyl, a carboxylic ester, an amide e.g. carboxylamide, an acylamino, a carbamoyl, a nitrile etc. or $R^7$ and $R^8$ or $R^9$ and $R^{10}$ together with the atoms to which they are attached represent the necessary atoms to complete a ring.

Suitable light-stabilizers corresponding to the above general formulas are given in Table 1, 2, 3 and 4 hereinafter. In the following table the meanings of the fragments A1–A9 is as follows:

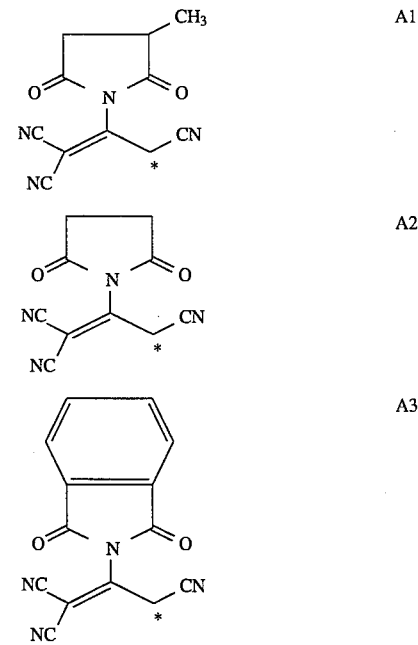

-continued

A4
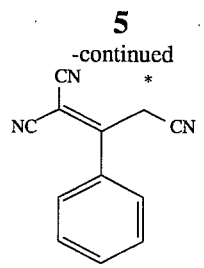

A5
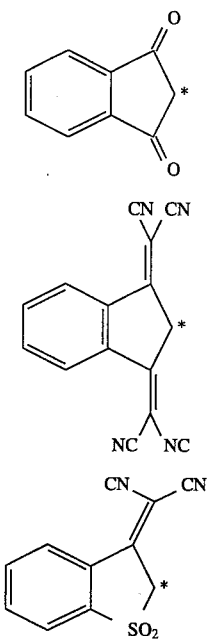

A6

A7

A8
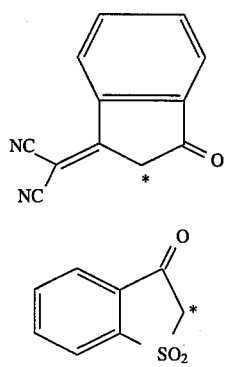

A9

TABLE 1
(thiazolylazo dyes)

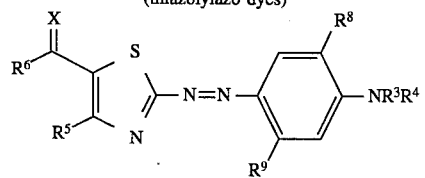

| Compound | $R^3$ | $R^4$ | $R^9$ | $R^8$ | $R^5$ | $R^6$ | X |
|---|---|---|---|---|---|---|---|
| S1 | $C_4H_9$ | $CH(CH_3)C_2H_5$ | H | H | $OCH_3$ | H | A1 |
| S2 | $C_4H_9$ | $CH(CH_3)C_2H_5$ | H | H | $OCH_3$ | H | A2 |
| S3 | $C_4H_9$ | $CH(CH_3)C_2H_5$ | H | H | $OCH_3$ | H | A3 |

TABLE 1-continued
(thiazolylazo dyes)

| Compound | $R^3$ | $R^4$ | $R^9$ | $R^8$ | $R^5$ | $R^6$ | X |
|---|---|---|---|---|---|---|---|
| S4 | $C_4H_9$ | $CH(CH_3)C_2H_5$ | H | H | $OCH_3$ | H | A4 |
| S5 | $C_4H_9$ | $CH(CH_3)C_2H_5$ | H | H | $OCH_3$ | CN | A5 |
| S6 | $C_4H_9$ | $CH(CH_3)C_2H_5$ | H | H | $OCH_3$ | CN | A6 |
| S7 | $C_4H_9$ | $CH(CH_3)C_2H_5$ | H | H | $OCH_3$ | H | A6 |
| S8 | $C_4H_9$ | $CH(CH_3)C_2H_5$ | H | H | $OCH_3$ | H | A7 |
| S9 | $C_4H_9$ | $CH(CH_3)C_2H_5$ | H | H | $OCH_3$ | CN | A7 |
| S10 | $C_4H_9$ | $C_4H_9$ | H | H | $OCH_3$ | H | A1 |
| S11 | $C_4H_9$ | $C_4H_9$ | H | H | $OCH_3$ | H | A8 |
| S12 | $C_4H_9$ | $C_4H_9$ | H | H | $OCH_3$ | H | A9 |
| S13 | $C_4H_9$ | $C_4H_9$ | $OCH_3$ | H | $OCH_3$ | H | A1 |

S14

S15

S16
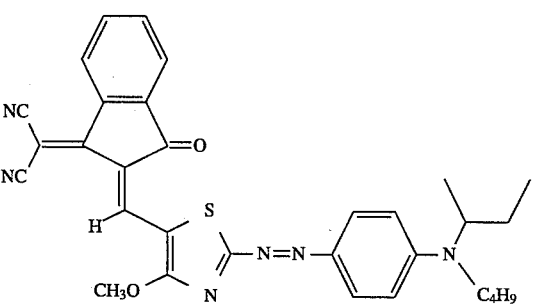

TABLE 2

![structure with R6, X, R5, CN, S, N=N, R9, R8, NR3R4]

| Compound | R³ | R⁴ | R⁹ | R⁸ | R⁵ | R⁶ | X |
|---|---|---|---|---|---|---|---|
| T1  | $C_2H_5$ | $C_2H_5$ | H | H | $OCH_3$ | CN | $C(CN)_2$ |
| T2  | $C_4H_9$ | $C_4H_9$ | H | H | $OCH_3$ | CN | $C(CN)_2$ |
| T3  | $C_4H_9$ | $CH(CH_3)C_2H_5$ | H | H | $OCH_3$ | CN | $C(CN)_2$ |
| T4  | $C_4H_9$ | $CH(CH_3)C_2H_5$ | H | H | $OC_2H_5$ | CN | $C(CN)_2$ |
| T5  | $C_4H_9$ | $CH(CH_3)C_2H_5$ | H | H | $SC_6H_5$ | CN | $C(CN)_2$ |
| T6  | $C_4H_9$ | $CH(CH_3)C_2H_5$ | $OCH_3$ | H | $OCH_3$ | CN | $C(CN)_2$ |
| T7  | $C_4H_9$ | $CH(CH_3)C_2H_5$ | $NHCOCH_3$ | H | $OCH_3$ | CN | $C(CN)_2$ |
| T8  | $CH_2CH(CH_3)_2$ | $CH_2CH(CH_3)_2$ | H | H | $OCH_3$ | CN | $C(CN)_2$ |
| T9  | $C_4H_9$ | $CH_2CH(CH_3)_2$ | H | H | $OCH_3$ | CN | $C(CN)_2$ |
| T10 | $C_2H_5$ | $CH_2CH(CH_3)_2$ | H | H | $OCH_3$ | CN | $C(CN)_2$ |
| T11 | $C_2H_5$ | $CH(CH_3)C_2H_5$ | H | H | $OCH_3$ | CN | $C(CN)_2$ |
| T12 | $C_4H_9$ | $CH(CH_3)C_2H_5$ | H | H | $OCH_3$ | H | A1 |
| T13 | $C_4H_9$ | $CH(CH_3)C_2H_5$ | H | H | $OCH_3$ | H | A2 |
| T14 | $C_4H_9$ | $CH(CH_3)C_2H_5$ | H | H | $OCH_3$ | H | A3 |
| T15 | $C_4H_9$ | $CH(CH_3)C_2H_5$ | H | H | $OCH_3$ | H | A4 |
| T16 | $C_4H_9$ | $CH(CH_3)C_2H_5$ | H | H | $OCH_3$ | H | A5 |
| T17 | $C_4H_9$ | $CH(CH_3)C_2H_5$ | H | H | $OCH_3$ | CN | A5 |
| T18 | $C_4H_9$ | $CH(CH_3)C_2H_5$ | H | H | $OCH_3$ | CN | A6 |
| T19 | $C_4H_9$ | $CH(CH_3)C_2H_5$ | H | H | $OCH_3$ | H | A6 |
| T20 | $C_4H_9$ | $CH(CH_3)C_2H_5$ | H | H | $OCH_3$ | H | A7 |
| T21 | $C_4H_9$ | $CH(CH_3)C_2H_5$ | H | H | $OCH_3$ | CN | A7 |
| T22 | $C_4H_9$ | $C_4H_9$ | H | H | $OCH_3$ | H | A1 |
| T23 | $C_4H_9$ | $C_4H_9$ | H | H | $OCH_3$ | H | A8 |
| T24 | $C_4H_9$ | $C_4H_9$ | H | H | $OCH_3$ | H | A9 |
| T25 | $C_4H_9$ | $C_4H_9$ | $OCH_3$ | H | $OCH_3$ | H | A1 |
| T26 | $C_4H_9$ | $CH(CH_3)C_2H_5$ | H | H | $OCH_3$ | H | A8 |

T27

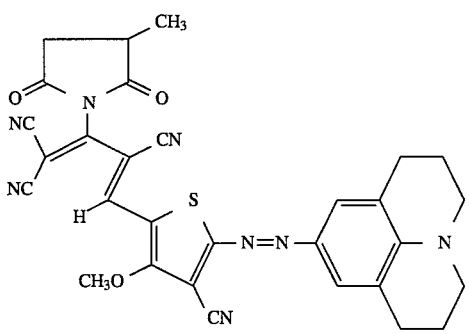

T28

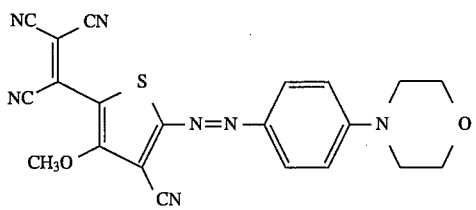

T29

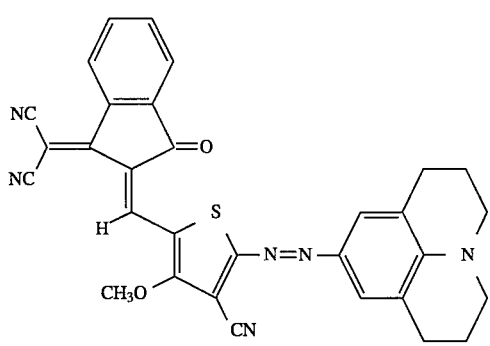

TABLE 2-continued

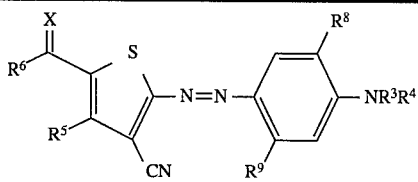

| Compound | R³ | R⁴ | R⁹ | R⁸ | R⁵ | R⁶ | X |
|---|---|---|---|---|---|---|---|

T30

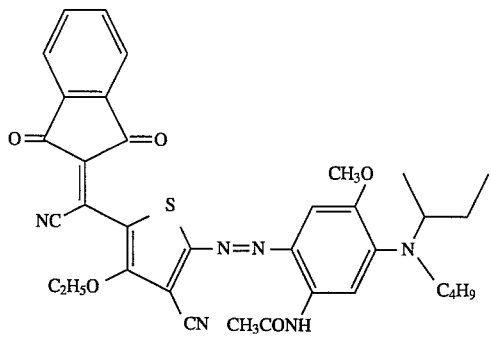

TABLE 3

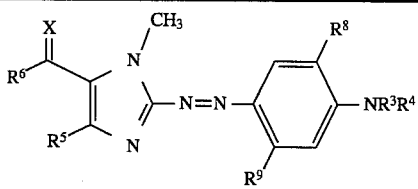

| Compound | R³ | R⁴ | R⁹ | R⁸ | R⁵ | R⁶ | X |
|---|---|---|---|---|---|---|---|
| I1 | $C_2H_5$ | $C_2H_5$ | H | H | $OCH_3$ | CN | $C(CN)_2$ |
| I2 | $C_4H_9$ | $C_4H_9$ | H | H | $OCH_3$ | CN | $C(CN)_2$ |
| I3 | $C_4H_9$ | $CH(CH_3)C_2H_5$ | H | H | $OCH_3$ | CN | $C(CN)_2$ |
| I4 | $C_4H_9$ | $CH(CH_3)C_2H_5$ | H | H | $OC_2H_5$ | CN | $C(CN)_2$ |
| I5 | $C_4H_9$ | $CH(CH_3)C_2H_5$ | H | H | $SC_6H_5$ | CN | $C(CN)_2$ |
| I6 | $C_4H_9$ | $CH(CH_3)C_2H_5$ | $OCH_3$ | H | $OCH_3$ | CN | $C(CN)_2$ |
| I7 | $C_4H_9$ | $CH(CH_3)C_2H_5$ | $NHCOCH_3$ | H | $OCH_3$ | CN | $C(CN)_2$ |
| I8 | $CH_2CH(CH_3)_2$ | $CH_2CH(CH_3)_2$ | H | H | $OCH_3$ | CN | $C(CN)_2$ |
| I9 | $C_4H_9$ | $CH_2CH(CH_3)_2$ | H | H | $OCH_3$ | CN | $C(CN)_2$ |
| I10 | $C_2H_5$ | $CH_2CH(CH_3)_2$ | H | H | $OCH_3$ | CN | $C(CN)_2$ |
| I11 | $C_2H_5$ | $CH(CH_3)C_2H_5$ | H | H | $OCH_3$ | CN | $C(CN)_2$ |
| I12 | $C_4H_9$ | $CH(CH_3)C_2H_5$ | H | H | $OCH_3$ | H | A1 |
| I13 | $C_4H_9$ | $CH(CH_3)C_2H_5$ | H | H | $OCH_3$ | H | A2 |
| I14 | $C_4H_9$ | $CH(CH_3)C_2H_5$ | H | H | $OCH_3$ | H | A3 |
| I15 | $C_4H_9$ | $CH(CH_3)C_2H_5$ | H | H | $OCH_3$ | H | A4 |
| I16 | $C_4H_9$ | $CH(CH_3)C_2H_5$ | H | H | $OCH_3$ | H | A5 |
| I17 | $C_4H_9$ | $CH(CH_3)C_2H_5$ | H | H | $OCH_3$ | CN | A5 |
| I18 | $C_4H_9$ | $CH(CH_3)C_2H_5$ | H | H | $OCH_3$ | CN | A6 |
| I19 | $C_4H_9$ | $CH(CH_3)C_2H_5$ | H | H | $OCH_3$ | H | A6 |
| I20 | $C_4H_9$ | $CH(CH_3)C_2H_5$ | H | H | $OCH_3$ | H | A7 |
| I21 | $C_4H_9$ | $CH(CH_3)C_2H_5$ | H | H | $OCH_3$ | CN | A7 |
| I22 | $C_4H_9$ | $C_4H_9$ | H | H | $OCH_3$ | H | A1 |
| I23 | $C_4H_9$ | $C_4H_9$ | H | H | $OCH_3$ | H | A8 |
| I24 | $C_4H_9$ | $C_4H_9$ | H | H | $OCH_3$ | H | A9 |
| I25 | $C_4H_9$ | $C_4H_9$ | $OCH_3$ | H | $OCH_3$ | H | A1 |

TABLE 3-continued

| Compound | R³ | R⁴ | R⁹ | R⁸ | R⁵ | R⁶ | X |
|---|---|---|---|---|---|---|---|

I26

I27

I28

I29

The infrared absorbing azo dyes used in accordance with the invention can be prepared according to the synthetic procedures disclosed in U.S. Pat. Nos. 4,395,544, 4,505,857, EP 0216483, EP92202156, U.S. Pat. Nos. 4,987,119, 4,985,395, 5,026,677, 5,134,115 and according to methods known to those who are skilled in the art of organic synthesis. Thiazolylazo dyes, their synthesis and use in dye donor elements are disclosed in EP 453 020 and EP 578 870.

The absorption maxima ($\lambda_{max}$) and molar extinction coefficients ($\epsilon$) of some dyes according to the invention were determined in methanol, unless stated otherwise. The absorption maximum ($\lambda'_{max}$) of the dye when transferred to an image receiving layer, such as described in example 1, containing as a binder a copolymer of vinylacetate and vinylchloride hardened with a polyisocyanate were also determined for some dyes. The values are listed in Table 4.

TABLE 4

| Compound | $\lambda_{max}$ (nm) | $\epsilon_{max}$ | $\lambda'_{max}$ (nm) |
| --- | --- | --- | --- |
| S1 | 782 | 85871 | 808 |
| S10 | 777 | 83808 | 800 |
| T12 | 798 | 57612 | 792; 840 |
| I22 | 720 | 83917 | 752 |
| S16[b] | 752 | 71305 | |
| S5[c] | 738 | 62894 | |
| T2[a] | 734 | 75557 | |
| T16 | 672 | 64972 | |
| T26 | 726 | 54348 | |
| T17 | 698 | 51037 | |
| T3 | 734 | 77331 | |

[a] determined in $CH_2Cl_2$ / $CH_3OH$ (1/9)
[b] determined in $CH_2Cl_2$ / $CH_3OH$ (2/8)
[c] determined in $CH_2Cl_2$ / $CH_3OH$ (1/1)

The infrared absorbing azo dyes in accordance with the present invention can also be used for stabilising dyes or dye mixtures in e.g. ink-jet printing or paintings.

Any dye can be used in the dye layer of the dye-donor element of the present invention provided it is transferable by the action of heat to the receiver sheet and provided it is not altered chemically by the light-stabilizer by said action of heat.

As mentioned before the dye layer can be a monochromic dye layer or it may comprise sequential repeating areas of differently coloured dyes. In case the dye layer is a monochromic dye layer the light-stabilizer may be incorporated therein. In case the dye layer consists of repeating areas of different dyes the light-stabilizer is preferably incorporated together with the different dyes in each of said repeating areas. In that case the light-stabilizer is transferred together with dye during the same heating cycle. This brings the advantage that at areas of minimum density (Dmin), i.e. areas to which little or no dye is transferred, also little or no light-stabilizer is transferred and that at areas of maximum density (Dmax), i.e. areas to which high amounts of dye are transferred, also high amounts of light-stabilizer are transferred; in other words there is a direct quantitative relation between transferred dye and transferred light-stabilizer so that an optimal light-stabilization of the transferred dye is guaranteed.

It is, of course, also possible to incorporate the light-stabilizer in a separate repeating area that does not comprise a thermotransferable dye. In that case it is transferred during a heating cycle that is different from that causing transfer of dye.

As a further alternative the light stabilizer can be included in a separate layer on top of the dye layer or between the dye layer and the support. In this case also there will be a relationship between the amount of dye transferred and the amount of light stabiliser transferred.

The light-stabilizer can be used in amounts of 10 to 200% by weight, preferably 20 to 150% by weight, calculated on the weight of dye.

The dye layer of the dye-donor element is formed preferably by adding the dyes, the light-stabilizer, a polymeric binder medium, and other optional components to a suitable solvent or solvent mixture, dissolving or dispersing these ingredients to form a coating composition that is applied to a support, which may have been provided first with an adhesive or subbing layer, and dried.

The dye layer thus formed generally has a thickness of about 0.2 to 5.0 μm, preferably 0.4 to 2.0 μm, and the amount ratio of dye to binder generally ranges from 9:1 to 1:3 weight, preferably from 3:1 to 1:2 by weight.

The light-stabilizer can also be present in the dye-donor element in separate repeating areas that do not comprise dye or even in a separate layer adjacent to the dye layer e.g. on top thereof. Such separate repeating areas or such separate layer may then comprise a polymeric binder and other optional components in addition to the light-stabilizer.

The following polymers can be used as polymeric binder: cellulose derivatives, such as ethyl cellulose, hydroxyethyl cellulose, ethylhydroxy cellulose, ethylhydroxyethyl cellulose, hydroxypropyl cellulose, methyl cellulose, cellulose nitrate, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic. Preferably, the binder for the dye layer of the present invention comprises cellulose acetate butyrate or copolystyrene-acrylonitrile.

The dye-donor element of the present invention can be used for the recording of a coloured image together with primary colour dye-donor elements comprising a magenta dye or a mixture of magenta dyes, a cyan dye or a mixture of cyan dyes, and a yellow dye or a mixture of yellow dyes respectively.

The light-stabilizers can be used alone or mixed with one another, or even mixed with other primary colour dyes.

Typical and specific examples of other primary colour dyes for use in thermal dye sublimation transfer have been described in e.g. EP 400,706, EP 209,990, EP 216,483, EP 218,397, EP 227,095, EP 227,096, EP 229,374, EP 235,939, EP 247,737, EP 257,577, EP 257,580, EP 258,856, EP 279,330, EP 279,467, EP 285,665, U.S. Pat. Nos. 4,743,582, 4,753,922, 4,753,923, 4,757,046, 4,769,360, 4,771,035, JP 84/78,894, JP 84/78,895, JP 84/78,896, JP 84/227,490, JP 84/227,948, JP 85/27,594, JP 85/30,391, JP 85/229,787, JP 85/229,789, JP 85/229,790, JP 85/229,791, JP 85/229,792, JP 85/229,793, JP 85/229,795, JP 86/268,493, JP 86/268, 494, JP 85/268,495, and JP 86/284,489.

The dye layer and/or the layer comprising the light-stabilizer may also contain other additives, such as curing agents, preservatives, organic or inorganic fine particles, dispersing agents, antistatic agents, defoaming agents, viscosity-controlling agents, these and other ingredients having been described more fully in EP 133,011, EP 133,012, EP 111,004, and EP 279,467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given to a support comprising polyethylene terephthalate. In general, the support has a thickness of 2 to 30 μm. The support may also be coated with an adhesive of subbing layer, if desired.

The dye layer and/or the layer comprising the light-stabilizer can be coated or printed by a printing technique such as a gravure process.

A dye-barrier layer comprising a hydrophilic polymer may be provided between the support and the dye layer of the dye-donor element to enhance the dye transfer densities by preventing wrong-way transfer of dye backwards to the support. The dye barrier layer may contain any hydrophilic material that is useful for the intended purpose. In general, good results have been obtained with gelatin, polyacrylamide, polyisopropyl acrylamide, butyl methacrylate-grafted gelatin, ethyl methacrylate-grafted gelatin, ethyl acrylate-grafted gelatin, cellulose monoacetate, methylcellulose, polyvinyl alcohol, polyethyleneimine, polyacrylic acid, a mixture of polyvinyl alcohol and polyvinyl acetate, a mixture of polyvinyl alcohol and polyacrylic acid, or a mixture of cellulose monoacetate and polyacrylic acid. Suitable dye barrier layers have been described in e.g. EP 227,091 and EP 228,065. Certain hydrophilic polymers e.g. those described in EP 227,091 also have an adequate adhesion to the support and the dye layer, so that the need for a separate adhesive or subbing layer is avoided. These particular hydrophilic polymers used in a single layer in the dye-donor element thus perform a dual function, hence are referred to as dye-barrier/subbing layers.

Preferably the reverse side of the dye-donor element has been coated with a slipping layer to prevent the printing head from sticking to the dye-donor element. Such a slipping layer would comprise a lubricating material such as a surface-active agent, a liquid lubricant, a solid lubricant or mixtures thereof, with or without a polymeric binder. The surface-active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$–$C_{20}$ aliphatic acids. Examples of liquid lubricants include silicone oils, synthetic oils, saturated hydrocarbons, and glycols. Examples of solid lubricants include various higher alcohols such as stearyl alcohol, fatty acids and fatty acid esters. Suitable slipping layers have been described in e.g. EP 138,483, EP 227,090, U.S. Pat. Nos. 4,567,113, 4,572,860, 4,717,711. Preferably the slipping layer comprises copolystyrene-acrylonitrile or a styrene-acrylonitrile-butadiene copolymer or a mixture thereof or a polycarbonate as described in European patent application no. 527520, as binder and a polysiloxane-polyether copolymer or polytetrafluoroethylene or a mixture thereof as lubricant in an amount of 0.1 to 10% by weight of the binder or binder mixture.

According to the present invention the light stabiliser can be uniformily distributed in the image receiving layer of an receiving element for receiving an image-wise distribution of dye by thermal dye sublimation transfer from a dye-donor element.

The support for the receiver sheet that is used with the dye-donor element may be a transparent film of e.g. polyethylene terephthalate, a polyether sulfone, a polyimide, a cellulose ester or a polyvinyl alcohol-co-acetal. The support may also be a reflective one such as a baryta-coated paper, polyethylene-coated paper or white polyester i.e. white-pigmented polyester. Blue-coloured polyethylene terephthalate film can also be used as support.

To avoid poor adsorption of the transferred dye to the support of the receiver sheet this support can be coated with an image-receiving layer containing a dye-able resin, into which the dye can diffuse more readily. The image receiving layer may comprise as a dye-able resin e.g. a polycarbonate, a polyurethane, a polyester, a polyamide, polyvinyl chloride, copolystyrene-acrylonitrile, polycaprolactone, or mixtures thereof as binder. The dye-image receiving layer may also comprise a heat-cured product of poly(vinyl chloride/co-vinyl acetate/co-vinyl alcohol) and polyisocyanate as the dye-able resin. Further suitable image receiving layers have been described in e.g. EP 133,011, EP 133,012, EP 144,247, EP 227,094, and EP 228,066.

In case the light stabiliser is uniformily distributed in the image receiving element, the dye-donor element may or may not comprise the light-stabilizer.

The light-stabilizer according to the present invention can be present in the image-receiving layer of an image receiving sheet in an amount of 10 to 100% by weight calculated on the weight of binder present in said dye-image-receiving layer.

In order to further improve the light-fastness and other stabilities of recorded images singlet oxygen quenchers such as HALS-compounds (Hindered Amine Light-stabilizers) and/or antioxidants can be incorporated into the dye-image-receiving layer.

The dye layer of the dye-donor element or the dye-image-receiving layer of the receiving element may also contain a releasing agent that aids in separating the dye-donor element from the receiver sheet after transfer. The releasing agents can also be incorporated in a separate layer on at least part of the dye layer and/or of the dye-image-receiving layer. Suitable releasing agents are solid waxes, fluorine- or phosphate-containing surface-active agents and silicone oils. Suitable releasing agents have been described in e.g. EP 133,012, JP 85/19,138, and EP 227,092.

The dye-donor elements according to the invention are used to form a dye transfer image, which process comprises placing the dye layer of the dye-donor element in face-to-face relation with the dye-image-receiving layer of the receiving element and image-wise heating the dye-donor element. The transfer of the dye is accomplished by heating for about several milliseconds at a temperature of 400° C.

Image-wise heating in connection with the present invention is preferably carried out with a thermal head contacting the back of the dye donor element. Image-wise heating may also be carried out by means of laser. In the latter case it will be required to add to the dye layer a substance capable of absorbing the laser light and converting it into heat. Such substance can be an infrared absorbing compound when an infrared laser is used. Although in principal the light-stabilisers in accordance with the present invention, which are infrared absorbing, can be used as such substance it is highly preferred to use an infrared absorbing substance that does not transfer to the image receiving element.

When the process is performed for but one single colour, a monochromic dye transfer image is obtained. A multicolour image can be obtained by using a dye-donor element containing three or more primary colour dyes and sequentially performing the process steps described above for each colour. The above sandwich of dye-donor element and receiving element is formed on three occasions during the time when heat is applied by e.g. a thermal printing head. After the first dye has been transferred, the elements are peeled apart. A second dye-donor element (or another area of the dye-donor element with a different dye area) is then brought in register with the dye-receiving element and the process is repeated. The third colour and optionally further colours are obtained in the same manner.

The following examples illustrate the invention in more detail without, however, limiting the scope thereof. All parts are by weight unless otherwise stated.

EXAMPLE 1

Receiver sheets were prepared by coating a polyethylene terephthalate film support having a thickness of 175 μm with a dye-image-receiving image-receiving layer from a solution in ethyl methyl ketone of 3.6 g/m² of poly(vinyl chloride/co-vinyl acetate/co-vinyl alcohol) (Vinylite VAGD supplied by Union Carbide), 0.336 g/m² of a polyisocyanate (Desmodur VL supplied by Bayer AG), and 0.2 g/m² of hydroxy-modified polydimethylsiloxane (Tegomer H SI 2111 supplied by Goldschmidt).

A second type of receiver sheet was prepared similar as the above receiver sheet but with the exception that Desmodur VL was replaced by 0.435 g/m² of Desmodur N75.

Dye-donor elements for use according to thermal dye sublimation transfer were prepared as follows:

A solution comprising an amount of light-stabilizer as indicated in the following Table 5, 0.5% by weight of dye as indicated in Table 5, and 0.5% by weight of copolystyrene-acrylonitrile (Luran 388S, supplied by BASF, Germany) as binder in ethyl methyl ketone was prepared.

From this solution a dye layer having a wet thickness of 100 μm was coated on a polyethylene terephthalate film support having a thickness of 6 μm and carrying a conventional subbing layer. The resulting dye layer was dried by evaporation of the solvent.

The opposite side of the film support was coated with a subbing layer of a copolyester comprising ethylene glycol, adipic acid, neopentyl glycol, terephthalic acid, isophthalic acid, and glycerol.

The resulting subbing layer was covered with a solution in methyl ethyl ketone of 0.5 g/m² of a polycarbonate having the following structural formula to form a heat-resistant layer:

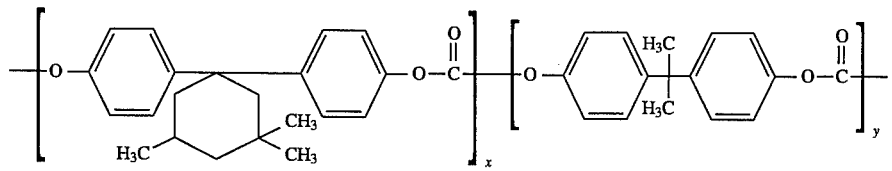

wherein x=55 mol % and y=45 mol %.

Finally, a top layer of polyether-modified polydimethylsiloxane (Tegoglide 410, Goldschmidt) was coated from a solution in isopropanol on the resulting heat-resistant polycarbonate layer.

The dye-donor element was printed in combination with a receiver sheet in a Mitsubishi colour video printer CP100E.

The receiver sheet was separated from the dye-donor element and the colour density value of the recorded image was measured by means of a Macbeth TR 924 densitometer in the red, green, and blue region in Status A mode.

The above described experiment was repeated for each of the dyes and light-stabilizers indicated in Table 5 hereinafter.

Finally, each receiver sheet was subjected to irradiation by means of a xenon lamp of 150 klux for a time indicated in hours in Table 5 and the colour density values were measured again. The density change was calculated and is listed in percent in Table 5.

The chemical structure of the dyes used in the experiments is given in Table 6 hereinafter.

TABLE 5

| Dye | Light-stabilizer | | Density change in % after xenon exposure for | |
|---|---|---|---|---|
| N° | N° | % by weight used | 4 h | 12 h |
| D01ᵃ |  | none | −4 | −24 |
| D01 |  | none | −24 | −60 |
| D01 | S.10 | 0.2 | −4 | −14 |
| D01 | S.10 | 0.5 | −4 | −14 |
| D01 | S.1 | 0.2 | −4 | −26 |
| D01 | S.1 | 0.5 | −6 | −18 |
| D01 | S.16 | 0.5 | −10 | −32 |
| D01 | S.5 | 0.5 | −2 | −13 |
| D01 | T.12 | 0.5 | −2 | −9 |
| D01 | I.22 | 0.5 | −3 | −16 |
| D01ᵃ | T3 | 0.2 | +2 | −1 |
| D01ᵃ | T3 | 0.5 | 0 | −1 |
| D01ᵃ | T16 | 0.2 | −2 | −10 |
| D01ᵃ | T16 | 0.5 | −4 | −13 |
| D01ᵃ | S16 | 0.2 | −2 | −12 |
| D01ᵃ | S16 | 0.5 | −1 | −25 |
| D01ᵃ | T2 | 0.2 | −3 | −3 |
| D01ᵃ | T2 | 0.5 | 0 | −1 |
| D02ᵃ |  | none | −4 | −24 |
| D02 |  | none | −36 | −73 |
| D02 | S.10 | 0.2 | −1 | −12 |
| D02 | S.10 | 0.5 | −1 | −10 |
| D02 | S.1 | 0.2 | −4 | −22 |
| D02 | S.1 | 0.5 | −4 | −15 |
| D02 | S.16 | 0.5 | −6 | −50 |
| D02 | S.5 | 0.5 | −8 | −50 |
| D02 | T.12 | 0.5 | −2 | −9 |
| D02 | I.22 | 0.5 | 0 | −9 |
| D02ᵃ | T.26 | 0.2 | −5 | −41 |
| D02ᵃ | T.26 | 0.5 | −8 | −27 |

TABLE 5-continued

| Dye | Light-stabilizer | | Density change in % after xenon exposure for | |
|---|---|---|---|---|
| N° | N° | % by weight used | 4 h | 12 h |
| D02ᵃ | T.16 | 0.2 | −2 | −17 |
| D02ᵃ | T.16 | 0.5 | −2 | −10 |
| D03 |  | none | −4 | −16 |
| D03 | S.10 | 0.2 | −2 | −11 |
| D03 | S.10 | 0.5 | −1 | −2 |
| D03 | S.1 | 0.5 | −1 | −7 |
| D03 | T.12 | 0.2 | −3 | −10 |
| D03 | T.12 | 0.5 | −1 | −7 |
| D04ᵃ |  | none | −4 | −24 |
| D04 |  | none | −3 | −41 |
| D04 | S.10 | 0.2 | 0 | −5 |
| D04 | S.10 | 0.5 | −2 | −4 |
| D04 | S.1 | 0.2 | −1 | −8 |
| D04 | S.1 | 0.5 | +5 | −1 |
| D04 | T.12 | 0.2 | 0 | −2 |
| D04 | T.12 | 0.5 | +1 | −2 |
| D04ᵃ | T.12 | 0.2 | 0 | −4 |
| D04ᵃ | T.12 | 0.5 | +1 | −1 |
| D04ᵃ | T.3 | 0.2 | +1 | −6 |
| D04ᵃ | T.3 | 0.5 | 0 | −4 |
| D05 |  | none | −11 | −36 |
| D05 | S.10 | 0.2 | 0 | −10 |

TABLE 5-continued

| Dye | Light-stabilizer | | Density change in % after xenon exposure for | |
|---|---|---|---|---|
| N° | N° | % by weight used | 4 h | 12 h |
| D05 | S.10 | 0.5 | −1 | −4 |
| D05 | S.1 | 0.2 | 0 | −6 |
| D05 | S.1 | 0.5 | −4 | −9 |
| D05 | T.12 | 0.2 | −1 | −12 |
| D05 | T.12 | 0.5 | −2 | −4 |
| D06 | none | | −88 | −95 |
| D06 | S.10 | 0.2 | −68 | −90 |
| D06 | S.10 | 0.5 | −53 | −79 |
| D07 | none | | −29 | −65 |
| D07 | S.1 | 0.2 | −6 | −15 |
| D07 | S.1 | 0.5 | −1 | −5 |
| D08 | none | | −3 | −17 |
| D08 | S.1 | 0.2 | −2 | −10 |
| D08 | S.1 | 0.5 | −2 | −9 |

[a] receiver sheets with Desmodur N75 as the polyisocyanate

TABLE 6

D01

D02

D03

D04

D05

D06

D07

TABLE 6-continued

D08

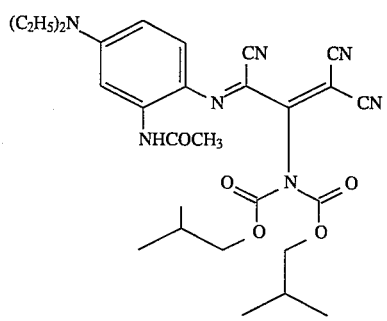

The results listed in Table 5 show that the light-stabilizers used according to the present invention improve the light stability of a wide range of dyes.

Example 2

Full color prints were prepared on the same film receiver sheets as described in example 1 by printing consecutively a yellow, magenta and cyan dye frame of a dye donor element on the receiver sheet. The yellow dye frame contained dye D04 of table 6 and the cyan dye frame contained the dye D08 of table 6. The magenta dye frame contained a mixture of the following dyes A and B in a ratio of respectively 9/2:

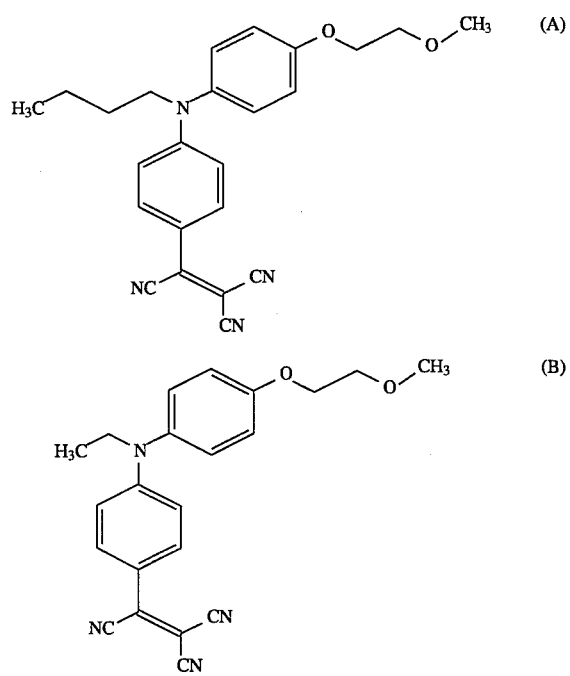

Concentrations of color dyes and binder are the same as described in Example 1. The light stabilities of the additive colors green, red, blue and black obtained by printing on top of each other the yellow, magenta and cyan dyes are determined in the same way as described in example 1. The results are given in Table 7.

TABLE 7

| Light-stabiliser | | | Density change (%) after Xenon exposure for | | | |
|---|---|---|---|---|---|---|
| no. | amount added in (%) | dye frame | color | filter | 4 h | 12 h | 28 h |
| — | — | — | red | green | −2 | −14 | −63 |
| | | | red | blue | −3 | −14 | −53 |
| | | | green | red | −14 | −49 | −98 |
| | | | green | blue | −3 | −8 | −62 |
| | | | blue | red | −6 | −17 | −62 |
| | | | blue | green | −2 | −9 | −43 |
| | | | black | red | −5 | −22 | −79 |
| | | | black | green | −2 | −6 | −43 |
| | | | black | visual | −3 | −13 | −57 |
| S1 | 0.25 | cyan | green | red | −5 | −15 | −39 |
| | | | green | blue | −1 | −4 | −12 |
| | | | blue | red | −4 | −7 | −22 |
| | | | blue | green | −2 | −5 | −16 |
| | | | black | red | −3 | −8 | −23 |
| | | | black | green | −1 | −4 | −10 |
| | | | black | visual | −2 | −6 | −16 |
| S1 | 0.25 | yellow | red | green | −1 | −7 | −48 |
| | | | red | blue | −2 | −10 | −42 |
| | | | green | red | −6 | −18 | −65 |
| | | | green | blue | −2 | −5 | −28 |
| | | | black | red | −5 | −18 | −56 |
| | | | black | green | −1 | −6 | −25 |
| | | | black | visual | −4 | −11 | −38 |
| S1 | 0.25 | cyan | red | green | 0 | −3 | −22 |
| | 0.25 | yellow | red | blue | −1 | −3 | −20 |
| | | | green | red | −8 | −10 | −18 |
| | | | green | blue | 0 | 0 | −5 |
| | | | blue | red | −2 | −8 | −23 |
| | | | blue | green | 0 | −3 | −15 |
| | | | black | red | −3 | −4 | −10 |
| | | | black | green | 0 | 0 | −5 |
| | | | black | visual | −1 | −1 | −6 |

From table 7 it can be seen that the light instability of color dye mixtures due to catalytic photofading is strongly improved by adding the light stabilisers according to the present invention.

We claim:

1. A dye donor element comprising on a support a dye layer containing a colorizing dye dispersed or dissolved in a binder and a thermotransferable infrared absorbing azo dye having an absorption maximum above 700 nm said thermotransferable infrared absorbing azo dye being comprised in said dye layer and/or in a layer adjacent thereto, and with the proviso that in case said thermotransferable infrared absorbing azo dye is a thiazolylazo dye it has an absorption maximum above 730 nm, said azo dye displaying little or no absorption in the visual range of the spectrum.

2. A dye donor element according to claim 1 wherein said thermotransferable infrared absorbing azo dye corresponds to the following general formula:

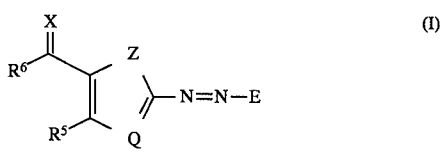

(I)

wherein:
E represents the residue of an aromatic coupling component E—Y, wherein Y is a group displaceable by a diazotised aromatic or heterocyclic amine;
Z represents O, S or $NR^{11}$ with $R^{11}$ representing hydrogen, an alkyl, alkenyl, aryl or aralkyl group;
Q represents N or $CR^{12}$ with $R^{12}$ representing hydrogen, an alkyl, an alkenyl, an aryl, an aralkyl, an alkoxy, an alkylthio, hydroxy, cyano, nitro, halogen, oxycarbonyl, a sulphonate, a phosphonate, an amine or carbamoyl group;

X represents $CR^1R^2$, wherein $R^1$ and $R^2$ independently represent a heterocyclic ring or an electron withdrawing group or $R^1$ and $R^2$ together with the atom to which they are attached represent the necessary atoms for completing a ring system;

$R^5$ represents hydrogen, halogen, CN, an alkyl or aryl group, an amino group, or W—R; W represents O, S, or $SO_2$ and R represents hydrogen, an alkyl, an aryl, a cycloalkyl or CN and $R^6$ represents hydrogen, an alkyl, an aryl, an aryloxy group, an alkoxy group, an alkylthio group, an amino group or an electron withdrawing group.

3. A dye donor element according to claim 1 wherein said thermotransferable infrared absorbing azo dye corresponds to the following formula:

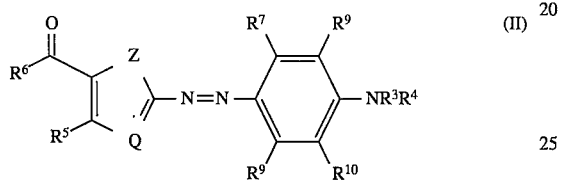
(II)

wherein:
Z, X, Q, $R^5$ and $R^6$ have the same meaning as defined in formula (I);

$R^3$ and $R^4$ each independently represent hydrogen, an alkyl group, an alkenyl group, an aryl group, or $R^3$ and $R^4$ together with each other or together with $R^8$ or $R^{10}$ represent the atoms necessary to complete a ring system and $R^7$, $R^8$, $R^9$ and $R^{10}$ each independently represent a hydrogen or a substituent such as e.g. an alkyl, an aryl, a halogen, an alkoxy, an oxycarbonyl, a carboxy, a carbamoyl, a nitrile etc. or $R^7$ and $R^8$ or $R^9$ and $R^{10}$ together with the atoms to which they are attached represent the necessary atoms to complete a ring.

4. A method for making an image comprising the steps of:
(i) bringing a dye donor element comprising on a support a dye layer containing a colorizing dye dispersed or dissolved in a binder and an infrared absorbing azo dye having an absorption maximum above 700 nm said infrared absorbing azo dye being comprised in said dye layer and/or a layer adjacent thereto in contact with an image receiving element comprising on a support an image receiving layer containing a dye-able resin such that said image receiving layer is in face-to-face relationship with said dye layer of said dye donor element;
(ii) image-wise heating said dye donor element, thereby causing image-wise transfer of said infrared absorbing azo dye and
(iii) separating said dye donor element from said image receiving element, with the proviso that in case said thermotransferable infrared absorbing azo dye is a thiazolylazo dye it has an absorption maximum above 730 nm, said azo dye displaying little or no absorption in the visual range of the spectrum.

5. A method according to claim 4 wherein said infrared absorbing azo dye corresponds to the following general formula:

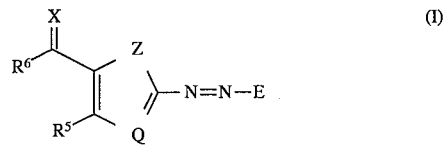
(I)

wherein:
E represents the residue of an aromatic coupling component E—Y, wherein Y is a group displaceable by a diazotised aromatic or heterocyclic amine;

Z represents O, S or $NR^{11}$ with $R^{11}$ representing hydrogen, an alkyl, alkenyl, aryl or aralkyl group;

Q represents N or $CR^{12}$ with $R^{12}$ representing hydrogen, an alkyl, an alkenyl, an aryl, an aralkyl, an alkoxy, an alkylthio, hydroxy, cyano, nitro, halogen, oxycarbonyl, a sulphonate, a phosphonate, an amine or carbamoyl group;

X represents $CR^1R^2$, wherein $R^1$ and $R^2$ independently represent a heterocyclic ring or an electron withdrawing group or $R^1$ and $R^2$ together with the atom to which they are attached represent the necessary atoms for completing a ring system;

$R^5$ represents hydrogen, halogen, CN, an alkyl or aryl group, an amino group, or W—R; W represents O, S, or $SO_2$ and R represents hydrogen, an alkyl, an aryl, a cycloalkyl or CN and $R^6$ represents hydrogen, an alkyl, an aryl, an aryloxy group, an alkoxy group, an alkylthio group, an amino group or an electron withdrawing group.

6. A method according to claim 4 wherein said infrared absorbing azo dye corresponds to the following formula:

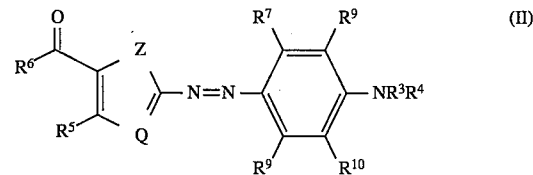
(II)

wherein:
Z, X, Q, $R^5$ and $R^6$ have the same meaning as defined in formula (I); $R^3$ and $R^4$ each independently represent hydrogen, an alkyl group, an alkenyl group, an aryl group, or $R^3$ and $R^4$ together with each other or together with $R^8$ or $R^{10}$ represent the atoms necessary to complete a ring system and $R^7$, $R^8$, $R^9$ and $R^{10}$ each independently represent a hydrogen or a substituent such as e.g. an alkyl, an aryl, a halogen, an alkoxy, an oxycarbonyl, a carboxy, a carbamoyl, a nitrile etc. or $R^7$ and $R^8$ or $R^9$ and $R^{10}$ together with the atoms to which they are attached represent the necessary atoms to complete a ring.

7. An assemblage comprising a dye donor element and an image receiving element, said dye donor element comprising on a support a dye layer containing a colorizing dye dispersed or dissolved in a binder and a thermotransferable infrared absorbing azo dye having an absorption maximum above 700 nm said thermotransferable infrared absorbing azo dye being comprised in said dye layer and/or in a layer adjacent thereto, and with the proviso that in case said thermotransferable infrared absorbing azo dye is a thiazolylazo dye it has an absorption maximum above 730 nm, said azo dye displaying little or no absorption in the visual range of the spectrum.

8. An assemblage according to claim 7 wherein said infrared absorbing azo dye corresponds to the following general formula:

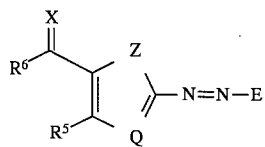 (I)

wherein:
- E represents the residue of an aromatic coupling component E—Y, wherein Y is a group displaceable by a diazotised aromatic or heterocyclic amine;
- Z represents O, S or $NR^{11}$ with $R^{11}$ representing hydrogen, an alkyl, alkenyl, aryl or aralkyl group;
- Q represents N or $CR^{12}$ with $R^{12}$ representing hydrogen, an alkyl, an alkenyl, an aryl, an aralkyl, an alkoxy, an alkylthio, hydroxy, cyano, nitro, halogen, oxycarbonyl, a sulphonate, a phosphonate, an amine or carbamoyl group;
- X represents $CR^1R^2$, wherein $R^1$ and $R^2$ independently represent a heterocyclic ring or an electron withdrawing group or $R^1$ and $R^2$ together with the atom to which they are attached represent the necessary atoms for completing a ring system;
- $R^5$ represents hydrogen, halogen, CN, an alkyl or aryl group, an amino group, or W—R; W represents O, S, or $SO_2$ and R represents hydrogen, an alkyl, an aryl, a cycloalkyl or CN and
- $R^6$ represents hydrogen, an alkyl, an aryl, an aryloxy group, an alkoxy group, an alkylthio group, an amino group or an electron withdrawing group.

9. An assemblage according to claim 7 wherein said infrared absorbing azo dye corresponds to the following formula:

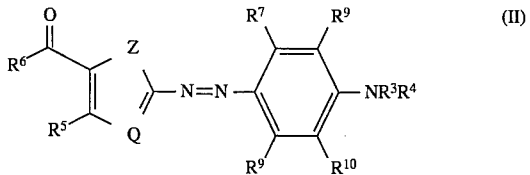 (II)

wherein:
- Z, X, Q, $R^5$ and $R^6$ have the same meaning as defined in formula (I); $R^3$ and $R^4$ each independently represent hydrogen, an alkyl group, an alkenyl group, an aryl group, or $R^3$ and $R^4$ together with each other or together with $R^8$ or $R^{10}$ represent the atoms necessary to complete a ring system and
- $R^7$, $R^8$, $R^9$ and $R^{10}$ each independently represent a hydrogen or a substituent such as e.g. an alkyl, an aryl, a halogen, an alkoxy, an oxycarbonyl, a carboxy, a carbamoyl, a nitrile etc. or $R^7$ and $R^8$ or $R^9$ and $R^{10}$ together with the atoms to which they are attached represent the necessary atoms to complete a ring.

* * * * *

UNITED STATES PATENT AND TRADEMARK OFFICE
CERTIFICATE OF CORRECTION

PATENT NO. : 5,571,765

DATED : November 5, 1996

INVENTOR(S) : Vanmaele et al.

Page 1 of 4

It is certified that error appears in the above-indentified patent and that said Letters Patent is hereby corrected as shown below:

Title page, 1st Column, 2nd line and Item 75, "VanMaele" should read --Vanmaele--;

Column 5, line 47 (the line before TABLE 1), insert -- * denotes the bonding position of the fragments.--;

Column 19, line 52, that portion of the formula (top right) reading "$_{//}N$" should read --$_{//}N$--;

Col. 19, line 55, that portion of the formula (top left) reading " 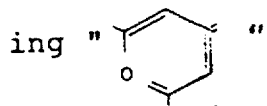 "

should read -- 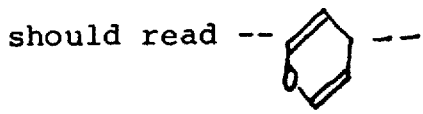 --

UNITED STATES PATENT AND TRADEMARK OFFICE
CERTIFICATE OF CORRECTION

PATENT NO. : 5,571,765
DATED : November 5, 1996
INVENTOR(S) : Vanmaele et al.

It is certified that error appears in the above-indentified patent and that said Letters Patent is hereby corrected as shown below:

Col. 23, line 20,

" 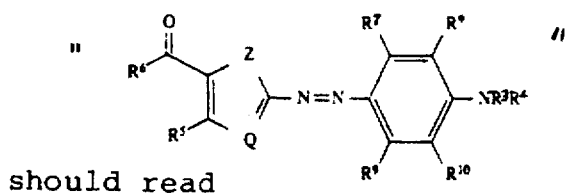 "

should read

-- 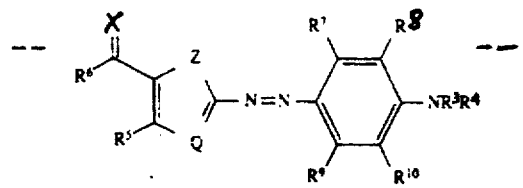 --

UNITED STATES PATENT AND TRADEMARK OFFICE
CERTIFICATE OF CORRECTION

PATENT NO. : 5,571,765
DATED : November 5, 1996
INVENTOR(S) : Vanmaele et al.

It is certified that error appears in the above-indentified patent and that said Letters Patent is hereby corrected as shown below:

Column 24, line 35,

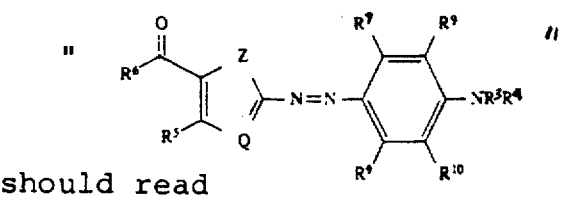

should read

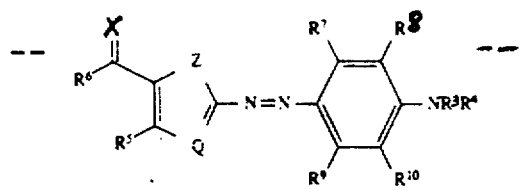

UNITED STATES PATENT AND TRADEMARK OFFICE
CERTIFICATE OF CORRECTION

PATENT NO. : 5,571,765
DATED : November 5, 1996
INVENTOR(S) : Vanmaele et al.

Page 4 of 4

It is certified that error appears in the above-indentified patent and that said Letters Patent is hereby corrected as shown below:

<u>Column 26, line 10,</u>

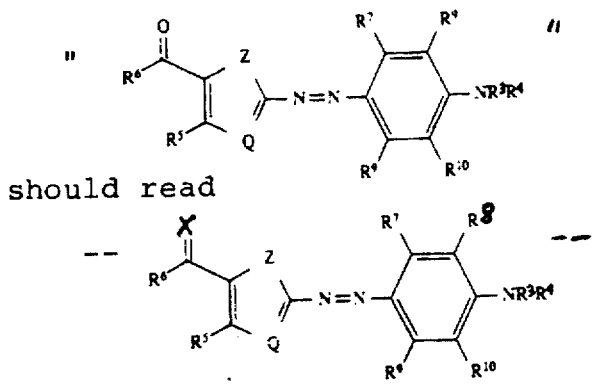

Signed and Sealed this

Seventeenth Day of June, 1997

Attest:

BRUCE LEHMAN

Attesting Officer

Commissioner of Patents and Trademarks